United States Patent [19]

Meinhardt

[11] Patent Number: 4,704,021

[45] Date of Patent: Nov. 3, 1987

[54] APPARATUS FOR THE EXPOSURE OF A RECORDING CARRIER INCLUDING ALPHA NUMBERIC CHARACTERS OF FACES HAVING A FOREGROUND PATTERN CONTRASTING RELATIVE TO A BACKGROUND PATTERN

[75] Inventor: Ferdinand Meinhardt, Sulzbach, Fed. Rep. of Germany

[73] Assignee: Linotype GmbH, Fed. Rep. of Germany

[21] Appl. No.: 893,769

[22] Filed: Aug. 6, 1986

[30] Foreign Application Priority Data

Aug. 22, 1985 [DE] Fed. Rep. of Germany ....... 3529964

[51] Int. Cl.$^4$ ............................................. G03B 15/00
[52] U.S. Cl. ....................................................... 354/7
[58] Field of Search ............... 354/6, 7; 358/296, 283; 178/30; 340/748

[56] References Cited

U.S. PATENT DOCUMENTS 4,081,604 3/1978 Kanaiwa ................................ 178/30
4,584,573 4/1986 Ito ..................................... 346/75 X

FOREIGN PATENT DOCUMENTS 2639856 3/1977 Fed. Rep. of Germany .
3226936 2/1983 Fed. Rep. of Germany .

Primary Examiner—Michael L. Gellner
Attorney, Agent, or Firm—A. Jose Cortina; W. F. Thornton

[57] ABSTRACT

An apparatus is provided for the exposure of a recording carrier including alpha numeric characters or faces having a foreground pattern contrasting relative to a background pattern. In accordance with the apparatus, the alpha numeric characters or faces in front of a background pattern are exposed by an intensity modulated scanning beam along scanning lines on the recording carrier. At the character or face borders, a switch-over control logic (3) switches over a modulator switch (2) connected to a scanning beam modulator (1) on various signal sources. The signal sources comprise raster video signal sources (10). A plurality of signal sources, which at the same time are prepared, in parallel relative to each other, to generate foreground pattern signals and background pattern signals, are controlled by a preselection control logic (13) which may be adjusted to maintain a preselection control state over arbitrarily selectable scanning line sections. The preselection control logic (13) activates during the course of the scanning along each scanning line section at least one of the signal sources each which feeds foreground pattern signals to the modulator switch and at the same time at least one of the signal sources each, which feeds background pattern signals into modulator switch (2).

11 Claims, 4 Drawing Figures

APPARATUS FOR THE EXPOSURE OF A RECORDING CARRIER INCLUDING ALPHA NUMBERIC CHARACTERS OF FACES HAVING A FOREGROUND PATTERN CONTRASTING RELATIVE TO A BACKGROUND PATTERN

BACKGROUND OF THE INVENTION

This invention relates to an apparatus for the exposure of a recording carrier to show alpha numeric characters or faces having a foreground pattern which contrasts relative to a background pattern. The exposure in this type of apparatus is generally accomplished with an intensity modulated scanner whose beam is moved along scanning lines above the recording carrier in the direction of the lines. These systems generally comprise a switch-over control logic for driving a modulator switch connected to a scanner heam modulator at the characters or face borders.

In a number of graphic applications, it is desirable to expose characters or alpha numeric characters, as is common, in a manner such that they all completely black on a white background, or with a reverse contrast on a recording carrier as white on a black background. The carrier is exposed to generate the characters by scanning along scanning lines particularly running in the direction of the lines. In the case of printed matter in advertisements or in form printing, area effects are generated on the exposed recording carrier, by filling defined area portions of the exposed recording carrier with small regular structures i.e., a pattern. Depending on the size and shape of these structures, they may be arranged to create rasters, shadings, signatures or similar structures. In the following description, these structures will generally be referred to as patterns. By definition, such patterns will also include half tone simulations where the pattern consists of abstract graphic elements, particularly small points, the size and distance of which are below the limit at which they can be individually perceived by the observer's eye as a half tone perception. In order to build a structure, patterns having abstract graphic elements may be used, the raster width of which in this case has to be so large that the structures can be perceived. The graphic elements of the patterns may finally also be regularly arranged signatures, for example, symbols on maps.

Up to now, such patterns have as a rule been generated independently from the typographic design, and then have subsequently been copied together with the typographic design. This process however is complicated, time consuming and requires extreme care.

It has therefore been attempted to simultaneously expose, by means of a so-called direct exposure of a recording carrier including alpha numeric characters or faces, a background pattern or foreground pattern. This technique is conventional and such a system is available as a form typesetting system from Purup Electronics under the trade name "Purup 4000".

Recently, it has also been attempted to so further develop a typographic laser exposer that can expose both raster as well as background patterns. By means of the laser exposer, technical rasters such as grey tone areas in forms, tables, price lists, prospectusses, etc. are displayed in various shapes and different tone grades. To this end, hardware raster generators have been developed which are loaded with corresponding patterns which are calculated prior to the recording, i.e., exposure, by the software, and are regularly repeated during exposure. The parameters defined by the operator for raster type, percentage area coverage, raster width and optimizing functions are automatically stored in one of the raster generators. In turn, they control, in relation to the data for the defined area sizes, X and Y positions and the type of display, i.e., script positive, negative or rastered on full tone or raster areas, the recording. Each raster point consists of micro elements or picture elements generally identified as pixels. Such a system is also conventional and commercially availahle from Linotype GmbH under the trade name "Linotronic 300". The "Linotronic 300" exposure system includes raster and background—compare Press Release features of the type well known to those of ordinary skill in this art.

One problem in the embodiment of such an exposure system including raster and background pattern is that a plurality of different patterns have to be provided for a comprehensive application, of which a few have to be used, during the line scanning of the recording carrier by the scanning beam, for the intensity modulation thereof. In this connection, it should be taken into consideration that at each line border, i.e., in the transition from the background pattern of an alpha numeric character to its inner foreground pattern, a change in the pattern occurs. In the case of a common black and white representation of the alpha numeric characters, when changing the pattern, one need switch the scanner beam modulator only from a black level to a white level of a static signal source, or vice versa. This switching-over required only a bit of airformation. In this regard, it is noted that the term "black level" or "white level" are conventional terms well known to those of ordinary skill in the art of computerized phototypsetting.

If a plurality of signal sources including raster generators are available for the generation of different patterns, it is obvious to expand the modulator switch which connects the scanning beam modulator at each point of intersection, i.e., at a border of an alpha numeric character or a face with one of the various signal sources, in a manner corresponding to the number of signal sources. Considering that in the course of a scanning line covered by the scanning beam a plurality of points of intersection are required, as a rule, to be scanned, the control of such an expanded modulator switch requires the generation, transfer and processing of a high data rate i.e., data amount per unit of time, which represents the successive points of intersection, where the points of intersection include a position on the scanning line, at which time switch-over of the modulator switch should occur, and at the same time should describe that pattern of a plurality of patterns available with the foreground pattern signals with background pattern signals of which the scanning beam modulator has to be supplied over the next scanning line section. Of course such processing typically requires a large amount of time, thus delaying the speed of operation of the device.

SUMMARY OF THE INVENTION

In accordance with present invention there is provided an apparatus for exposing a recording carrier with alpha numeric characters or faces having a foreground pattern contrasting relative to a background pattern, which apparatus is construch such that the data rate, or the information amount, respectively, which has to be generated, transferred and processed for controlling the selection of the various available patterns at each point of intersection of the character or face in a scanning line is reduced. In this manner, the scanning speed in a given process is increased by making available, in real time, the foreground pattern signals and the background patterns signals which effect that particular modulation of the scanning beam.

The invention generally comprises an improvement in an apparatus of the above described type wherein the exposing is conducted with an intensity-modulated scanner beam moved along scanning lines above the recording carrier. The apparatus comprises a switch-over control logic for driving a modulator switch connected to a scanner beam modulator at the character or face borders to thereby switch various signal sources to the scanner beam modulator. In addition, raster generators are provided loaded with data respresentative of a number of patterns, which data is used to provde the signals from the raster generators. The improvement resides in that a preselection control logic is provided in combination with a plurality of signal sources arranged simultaneously and in parallel relative to each other for generating foreground pattern signals and background pattern signals. The preselection control logic is connected for activating the plurality of signal sources over arbitrarily selectable scanning line sections in a manner such that during the course of the scanning along each scanning line section at least one of the signal sources generates foreground pattern signals and at least one of the signal sources supplies background pattern signals to the modulator switch.

The broadly described invention is based on the principle that the modulator switch at any point of intersection of the alpha numeric character or face in the course of the scanning line need not make a selection between all available signal sources inclusive of the raster generators. Instead, for scanning line sections defined by an operator and supplied to an input device, by means of the preselection control logic, a preselection of at least one signal source each for the foreground pattern and at least one signal source each for the background pattern is made and is maintained for the scanning line section in question. While for each activation of such at least one signal source generating the background pattern defined for one scanning line section, and of at least one signal source each generating for this scanning line section the desired foreground pattern by means of a preselection control logic, controlling data have to be generated, transferred and processed. Accordingly, the controlling data, which corresponding to the number of available signal sources or patterns, respectively, have a great number of bits corresponding to the relatively large distances of the scanning line sections, are required relatively seldom. The data which, independently from the scanning line section, are required for switch-over of the modulator switch at the character borders must define, in addition to the position of the point of intersection on the scanning line, again by one bit each only, the position of a modulator switch between two positions where in one position the modulator switch is connected to the preselected signal source of the foreground pattern, and in another switch position is connected to a preselected signal source of the background pattern. If one scanning line section has been selected equal to the scanning line length, i.e., if during the course of the scanning of an entire scanning line the background pattern signals and the foreground pattern signals have to be transmitted from one signal source each to the scanning beam modulator, there will not be any data generation and processing for the control of the statically adjusted preselection control logic for the period of this scanning. Only the data for the control of the modulator switch, as in the case of a conventional black/white intensity modulation of the scanning beam, have to be generated.

If the scanning line sections have been selected smaller than the length of a scanning line, the preselection control logic suitably will, in a specific aspect, automatically be synchronously changed relative to successive transitions between scanning line sections during the scanning. The data controlling the preselection control logic, including in each case a large information content, but occurring relatively seldom, will be referred to in the following description as pattern point of intersection data, as contrasted to character point of intersection data which control, at the borders of the alpha numeric characters or faces the switch-over control logic of the scanning beam modulator independently from the preselection of the signal sources.

The preselection control logic may, in one embodiment according to the invention, be part of the actual structure of the signal sources in order to activate them. This occurs through a control logic, each which is part of one raster video signal source. The signal sources include storages for storing data representative of a pattern with the respective control logics serving to activate the storages for generating a video signal modulated with the pattern.

The expenses for such a device are relatively small with such raster video signal sources, particularly if the individual control logics are simultaneously provided for further control tasks in connection with the selection of determined pattern parameters such as the actual raster width in the X and Y directions. In such a system an X counter and Y counter control the individual control logics. In this specific embodiment moreover, the apparatus may, in a relatively simple way, be enlarged to include additional signal sources which may be preselected for a particular foreground pattern or background pattern.

More generally speaking, almost any signal source may be activated by the preselection control logic of the invention for the selection of a pattern for the background and for the selection of a pattern for the foreground in one scanning line section. This is the case if the preselection control logic in to this embodiment is arranged to activate at least one preselection switch each of the foreground patterns and at least one preselection switch each of the background patterns which are connected to automatic signal sources. In particular, these preselection switches may be arranged between the signal sources and the modulator switch.

In accordance with a still more specific aspect, it is not only internal raster video signal sources which are constantly connected to the preselection switches which are provided as signal sources loaded with the data of the patterns, but other external signal sources of graphic special devices, for example, plotters are connectable to the preselection switches of the system and thus may be used as well. Static signal sources for black and white levels may also be preselected. The advantages of the access to a plurality of different patterns together with a high scanning rate may, in this manner, be fully exploited.

BRIEF DESCRIPTION OF THE DRAWINGS

In the following, the invention will be explained in more detail with reference to the appended drawings wherein.

DETAILED DISCUSSION OF THE INVENTION

Figure 1:
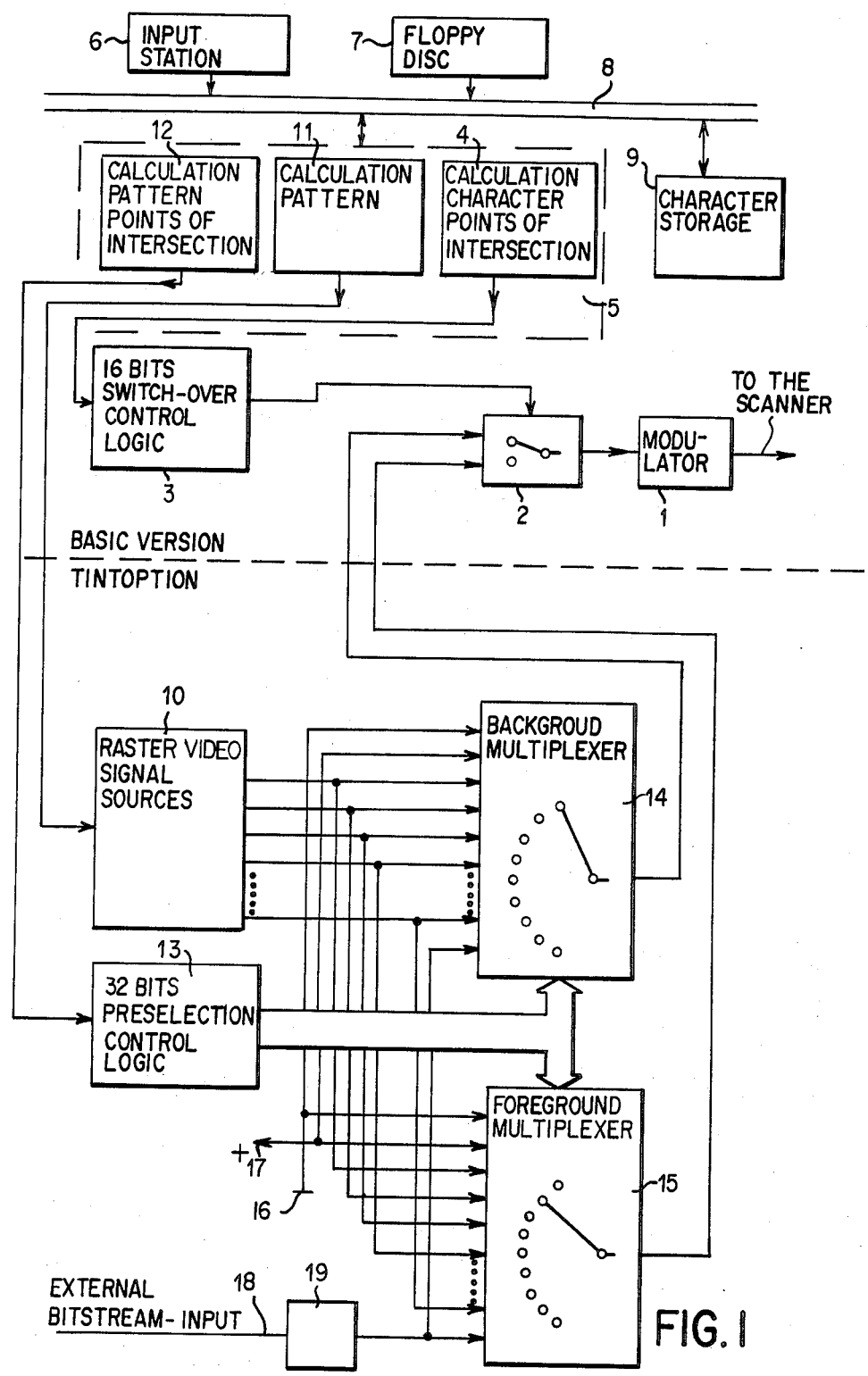
FIG. 1 schematically in block diagram form shows the device of the invention as a portion of an electronic typesetter.

In FIG. 1, a scanning beam modulator/ of a conventional nature is shown for intensity-modulating a scanning beam, particularly a laser beam, in a laser scanner (not shown). The scanning beam modulator 1 may be switched over by a modulator switch 2, which may have two switching positions, and which is electrically selectable, to one of a background multiplexer 14 or a foreground multiplexer 15. The modulator switch 2 is activated by a switch-over control logic 3 connected thereto. The switch-over control logic 3 is supplied controlling data as digital numbers having 16 bits which define or are representative of the position of points of intersection at the character borders in the path of one scanning line, as well as the position of the modulator switch as referred to the corresponding character point of intersection. The character points of intersection are calculated in a module 4 of an electronic computer 5. The various elements described are conventional and the selection thereof is well known to those of ordinary skill in the art based the above and hereinafter continued description.

The calculation of character points is based on points of intersection of the alpha numeric characters occurring along an assigned scanning line, which are to be imaged by successive side-by-side arranged scanning lines. The computer 5 employs the size, the kind and the distance of the characters on the scanning line in its calculation. The control data for the successive characters may be fed through a manual input station 6 or floppy disc station 7 through a bus 8 to the computer 5. The data of the outlines of the selected alpha numeric characters may be read out from a character storage 9 to calculate the points of intersection of the characters. The calculation of the points of intersection of the characters in a scanning line is a conventional technique in the field of computerized phototypesetting.

With the input device 6 it can also be determined which foreground and background patterns may be exposed during scanning line section. The raster line sections are defined by rectangular coordinates. Thus, regenerable raster video signal sources 10 are loaded with data representative of the patterns determined in a calculating module 11 of computer 5. Corresponding to the rectangular coordinates of the patterns fed by input device 6 into the computer 5, the data of the pattern points of intersection are calculated, in a module 12 of the computer 5, as digital numbers having 32 bits. In groupings of 15 bits, the digital numbers define the position on the scanning line wherein a definition of the foreground patterns and the background patterns should be valid. By the remaining bits, the kind of patterns is defined, i.e., that signal source which, during the respective scanning line section, is employed to generate the foreground pattern signals, and that signal source which, during the same scanning line section, is employed to generate the background pattern signals.

The computer 5 is a conventional microprocessor system comprising a CPU, a system memory, interfaces to input, output and storage media like floppy disc drives, further comprising a bus system and a power supply. The modules 4, 11, 12 are software modules running on this microprocessor.

The calculated digital numbers of the pattern points of intersection are fed into a preselection control logic 13 The preselection control logic 13 serves to control the switching position of one electronic multiplexer 14, each for the background pattern, and one electronic multiplexer 15 each for the foreground pattern The electronic multiplexers 14, 15 constitute the preselection switches. They include parallel inputs for all signal sources and one output each connected to one switch-over contact each of the modulator switch 2. In an actual embodiment, the multiplexers are not arranged in a signal flow path between outputs of the signal sources, particularly raster video signal sources 10, and the switch-over contacts of the modulator switch 2, but instead cause that of the prepared signal sources 10, one signal source each generates the foreground pattern signals and transmits them to the modulator switch 2, and the other preselected signal source feeds the background pattern signals into the modulator switch 2 The foreground and background pattern signals are pixel currents in the form of modulated video signals.

Multiplexers 14 and 15 not only switch raster video signal sources 10 but also switch static signal sources for black and white levels 16, 17, and in addition, through an interface 19, a switch raster data channel to which an external graphic device is connected, to modulator switch 2, if and when multiplexers 14, 15 have been adjusted, by preselection control logic 13, to respective preselection positions.

Figure 2A:
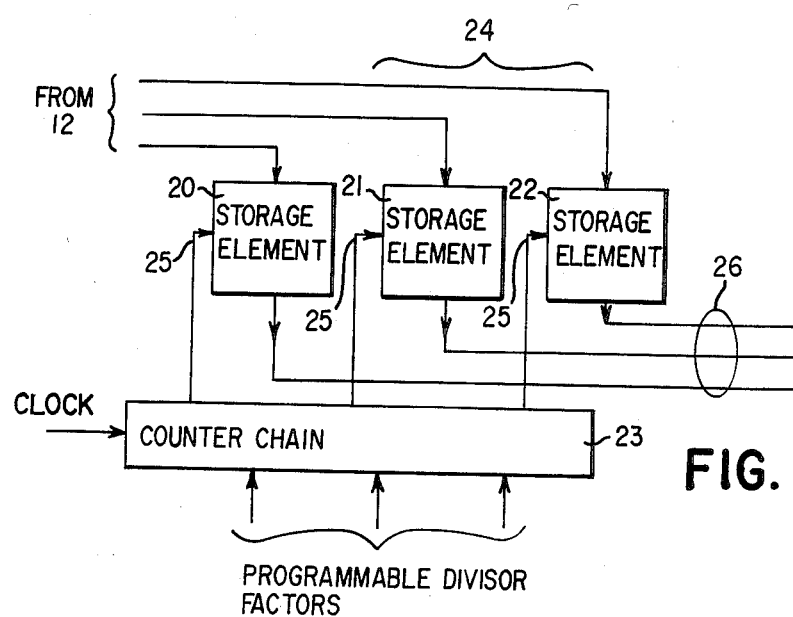
FIG. 2A illustrates a portion of the preselection control logic of the invention.

In FIG. 2A, a portion of the preselection control logic is depicted to which a signal source is assigned, i.e., which it may activate to generate a modulated video signal. This portion comprises conventional storage elements 20–22, the address inputs 25 of which are selectable by a counter chain 23. The divider factor of the counter chain is programmable through divider inputs. Outputs 26 of the storage elements are connected to multiplexers 14, 15, or to a circuit portion of one of the raster video signal sources, each shown in FIG. 2B, which corresponds to a portion of the multiplexers 14, 15.

Prior to the beginning of the scanning of a scanning line, the data of the pattern points of intersection are fed from module 12 of the computer 5 into the storage elements 20–22, specifically as digital numbers having 32 bits, and during the course of the scanning of the scanning line, preselection control signals are fed serially from outputs 26 to multiplexers 14, 15, or the corresponding portions of raster video signal sources 10. The internal sequence of the preselection control logic is controlled by adjustable counter chain 23, which is driven by a clock signal derived from the video frequency.

Figure 2B:
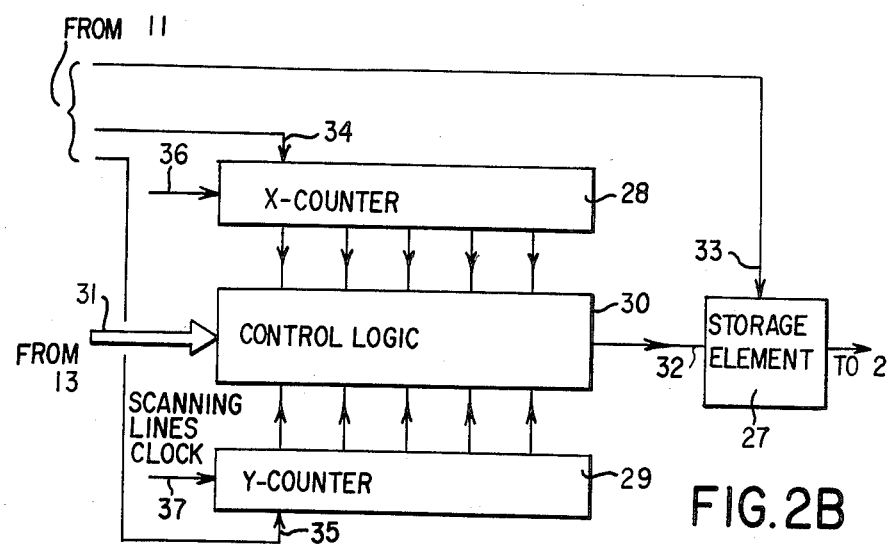
FIG. 2B illustrates a raster video signal source arrangement according to the invention.

In FIG. 2B a reloadable raster video signal source is shown. The source comprises essentially, in addition to a storage elements, an X counter 28 and a Y counter 29 for controlling a control logic 30 which is controlled by the preselection control logic at input 31. The storage elements of the video signal source are designed as rapid static storages, because they are read out by the video frequency. The storage elements may be addressed via address lines 25 of the control logic and may be loaded through storage inputs 33 from module 11 of the computer 5 for pattern computation and a bit combination which constitutes the smallest common multiple of a pattern repeated in X and Y direction. Counter inputs 34, 35 are also preadjusted, by module 11, for pattern computation with pattern information. More specifically, counter input 34 is preadjusted with the actual raster width in the X direction and counter input 35 is preadjusted with the actual raster width in the Y direction. One clock input 36 of the X counter is driven by the video timing pulse, and clock input 37 of the Y counter is driven by a timing pulse which is generated in logic of computer 5 for the scanning line-wise continuous switching, for example, of Y counter 29.

In order to load the raster video sources, a job, i.e., a typesetting task is checked, prior to the typesetting, for patterns. When the pattern has been found, the raster video signal sources are loaded by portion 11 of computer 5 for pattern computation, as explained above in connection with the raster video signal source in FIG. 2B. Subsequently, during the scanning of the recording carrier, the X and Y counters are constantly checked even when storage elements 27 are not to modulate the video signal of the scanning. In this case, control logic 30 determines whether depending on the pattern points of intersection in the preselection control logic 26, the respective video signal generator modulates the video signal or not. The control logic has also an impact on the pattern in the X and Y directions with a view to the succession of the smallest multiple of the pattern in storages 27. The pattern points of intersection, the data of which are fed to the preselection control logic 13, are calculated prior to this in module 12 of computer 5, and are fed into the preselection control logic 30.

During the scanning of the recording carrier, a modulated video signal for background patterns is generated by activating one or a plurality of signal sources, particularly raster video signal sources, and at the same time a modulated video signal is generated for a foreground pattern corresponding to the control by control logic 30 of each of the signal sources. The great number of control logics therefore forms the preselection switches, or multiplexers 14, 15, respectively, for the foreground and background patterns. By means of the video signal preselection logic in connection with the signal sources, particularly the raster video signal sources depicted in FIG. 2B, a pattern point of intersection data having 32 bits may, starting from any position on the scanning line, redefine the foreground pattern signals and the background pattern signals.

The character points of intersection, the data of which arrive in switch-over control logic 3, determine whether the just-preselected foreground level or the just-preselected background level will modulate the scanning beam, i.e., to cause exposure.

The modulated video signals so preselected are switched-over by modulator switch 2 to the scanning beam modulator depending on whether or not between neighboring character or face borders, a defined background or foreground pattern has to be scanned.

Raster video signal sources 10 generate a number of different pattern signals, which may constitute both foreground pattern signals as well as background pattern signals depending on the position of multiplexers 14, 15 or the corresponding control logic units 30, at a plurality of levels which virtually are simultaneously available in parallel. In particular, these levels are identified as:

1. a white level over the entire format of the typesetting product, i.e., the output format;
2. a black level over the entire output format;
3. a number of levels including repeated small pattern cells; and
4. a level the effect of which on the typesetting product is determined by video signals fed externally through rater data channel 18, i.e., plottermode.

In this manner, a great variability of the typesetting product is made possible without increasing costs excessively by the requirement of computation of individual pattern points intersection.

Figure 3:
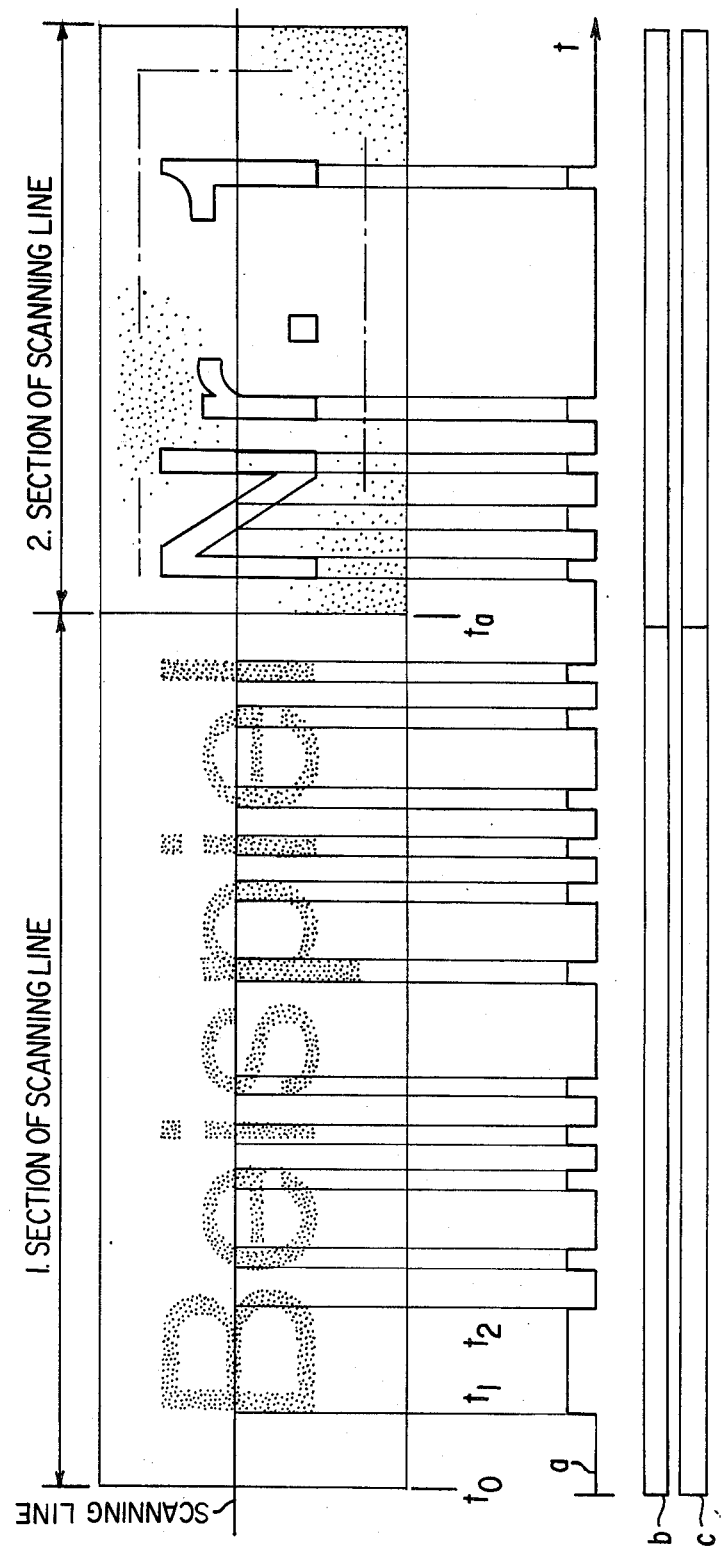
FIG. 3 is a representation of the time slope of the data controlling the system for a particular scan line.

In FIG. 3, the time slope of the switch position of the modulator switch, i.e., line "a", of the preselection position of multiplexer 14, i.e., band "b", and the preselection position of multiplexer 15 for the foreground, i.e., band "c", are shown. Two timely scanning line sections of the scanning line are provided. At the time $t_o$ at the beginning of the first scanning line section, multiplexer 14 is switched to a position for selecting a background pattern signal from n pattern signals made available by raster video signal sources 10. The background pattern signals yield a relatively bright pattern. Multiplexer 15, at time $t_o$, is switched to a different raster video signal source of raster video signal source 10, which generates foreground pattern signals producing a relatively dark pattern in the typesetting product. From $t_o$ to $t_1$, modulator switch 2 takes a first position, in which is passes on the background pattern signals to the scanning beam modulator. From $t_1$ to $t_2$, however, it conducts the foreground pattern signals of the foreground level to the scanning beam modulator.

Switch-over of the modulator switch requires each time only one bit of information. At the time $t_a$, the first scanning line section has been exposed and multiplexers 14 and 15 are switched over by the pattern points of intersection at this location, or at this time, respectively, into new preselection positions, wherein background pattern signals yielding a relatively dark background on exposure, as well as foreground pattern signals creating a relatively bright foreground by intensity modulation of the scanning beam, lie at modulator switch 2. Switch-over of the modulator switch is effected during the course of the second scanning line section basically in the same way as during the course of the first scanning line section.

In other words, the switch-over control logic for the modulator switch processes a relatively low data rate for the switch-over at each character border while the preselection control logic processes a relatively high data rate only for the borders of the scanning line sections in order to define the patterns of the foreground level and of the background level.

Having described the invention, the same will become better understood from the appended claims defining the invention in a non-limiting manner.

What is claimed is:

1. In apparatus for exposing a recording carrier for developing alpha numeric characters or faces on the carrier, which characters or faces have a foreground pattern contrasting relative to a background pattern, the exposing being conducted with an intensity-modulated scanner beam moved along scanning lines above said recording carrier, the apparatus comprising a switch-over control logic for driving a modulator switch connected to a scanner beam modulator at the character or face borders and to thereby switch various signal sources to the scanner beam modulator, and further comprising raster generators loaded with data of a number of patterns, as signal sources, the improvement wherein a preselection control logic (13) is provided in combination with a plurality of signal sources (10) arranged simultaneously and in parallel relative to each other for generating foreground pattern signals and background patterns signals said preselection control logic being arranged for activating said plurality of signal sources (10) over arbitrarily selectable scanning line sections in a manner such that during the course of the scanning along each scanning line section at least one of said signal sources generates foreground pattern signals and at least one of said signal sources feeds background pattern signals to said modulator switch.

2. An apparatus according to claim 1, further comprising at least one preselection switch (15) for supplying data for each of said foreground patterns and one preselection switch (14) for supplying data for said background patterns, each connected to a plurality of signal sources (10) arranged in parallel relative to one another for generating foreground pattern signals and background pattern signals, and each one of said preselection switches (14, 15) being controlled by said preselection control logic (13) through a selectable scanning line section, for maintaining a preselection control state.

3. An apparatus according to claim 1, wherein
preselection control logic (13) is of the type which is
automatically synchroneously changeable relative to subsequent transitions between scanning line sections (FIG. 3).

4. An apparatus according to claim 2, wherein said preselection switches (14, 15) are of the type automatically synchroneously controllable, by said preselection control logic (13), to subsequent transitions between scanning line sections (FIG. 3).

5. An apparatus according to claim 1, wherein said preselection control logic (13) is connected through a computer (5) to an operator input device (6).

6. An apparatus according to claim 2, wherein said preselection control logic (13) is connected through a computer (5) to an operator input device (6).

7. An apparatus according to claim 1, wherein said various signal sources are raster signal sources respectively including storages (27) for storing data representative of a pattern, and the apparatus further comprising control logic (30) connected to said preselection control logic, for activating the respective storages (27) for generating a video signal modulated with the pattern.

8. An apparatus according to claim 2, wherein said various signal sources are raster video signal sources respectively including storages (27) for storing data representative of a pattern, and the apparatus further comprising logic (30) connected to said preselection control logic, for activating the respective storage (27) for generating a video signal modulated with the pattern.

9. An apparatus according to claim 7, wherein said control logic (30) is controllable by an X counter (28) and a Y counter (29), arranged in said aparatus said X counter (28) being preselectable to define an actual raster width in the X direction of said recording carrier, said Y counter (28) arranged for being driven by a video pulse (X direction) and said Y counter (29) arranged for being driven by a clock pulse of a stepped circuit of said scanning lines (Y direction).

10. An apparatus according to claim 8, wherein said control logic (30) is controllable by an X counter (28) and a Y counter (29) arranged in said apparatus, said X counter (28) being preselectable to define an actual raster width in the X direction of said recording carrier, and said Y counter (29) being preselectable to define a raster width in the Y direction of said recording carrier, said X counter (28) arranged for being driven by a video pulse (X direction) and said Y counter (29) arranged for being driven by a clock pulse of a stepped circuit of said scanning lines (Y direction).

11. An apparatus according to claim 2 wheren said signal sources comprise internal raster video signe sources (10) constantly connected to said preselection switches (14, 15), static signe sources for black and white levels connectable to said preselection switch, and an external signal source also connectable to said preselection switch.

* * * * *